(12) United States Patent
Thomas

(10) Patent No.: US 6,998,998 B2
(45) Date of Patent: Feb. 14, 2006

(54) HIGH SPEED HAZARDOUS AREA COMMUNICATION WITH SAFETY BARRIERS

(75) Inventor: John A. Thomas, Porter, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 478 days.

(21) Appl. No.: 10/248,654

(22) Filed: Feb. 5, 2003

(65) Prior Publication Data

US 2004/0150531 A1     Aug. 5, 2004

(51) Int. Cl.
G01V 3/00         (2006.01)
(52) U.S. Cl. ............................. 340/853.1; 340/855.4; 361/52; 377/24; 377/335
(58) Field of Classification Search .......... 340/853.1, 340/855.4; 73/597; 361/52; 330/124 R; 327/24, 335; 375/286
See application file for complete search history.

(56) References Cited

U.S. PATENT DOCUMENTS

| 3,845,356 | A | * | 10/1974 | Bullard et al. ................. 361/52 |
| 4,835,486 | A | * | 5/1989 | Somerville ..................... 330/10 |
| 4,897,854 | A | | 1/1990 | Harris et al. |
| 4,964,140 | A | | 10/1990 | Yonekura |
| 5,207,101 | A | * | 5/1993 | Haynes ......................... 73/597 |
| 5,333,088 | A | | 7/1994 | Sweet |
| 5,712,631 | A | * | 1/1998 | Lewis et al. ............. 340/853.1 |
| 5,838,589 | A | | 11/1998 | Nail et al. |
| 5,945,850 | A | | 8/1999 | Segan et al. |
| 6,294,956 | B1 | | 9/2001 | Ghanadan et al. |
| 6,305,471 | B1 | * | 10/2001 | Milloy ................... 166/250.15 |
| 6,369,715 | B1 | * | 4/2002 | Bennett et al. ............. 340/618 |
| 6,397,322 | B1 | | 5/2002 | Voss |
| 6,885,949 | B1 | * | 4/2005 | Selli ........................... 702/57 |

FOREIGN PATENT DOCUMENTS

DE         140595 A      3/1980

* cited by examiner

Primary Examiner—Albert K. Wong
(74) Attorney, Agent, or Firm—Jennie (JL) Salazar; Victor H. Segura; Dale V. Gaudier

(57) ABSTRACT

A method and apparatus is disclosed for transmitting digital signals across safety transmission barrier. High data transfer rates are achieved for transfer from a safe certified device across the transmission barrier to a standard or non-rated device. A signal pair is generated including a first digital signal from the safe device and a second digital signal that is phase shifted from the first digital signal. Preferably, the second signal is phase shifted by 180 degrees, essentially being an inverted version of the first digital signal. The first and second digital signals are transmitted across the transmission barrier to a receiver in a safe area. An output signal is then reconstructed based on the falling edges of the first and second digital signals. The reconstructed signal closely approximates the first digital signal.

31 Claims, 9 Drawing Sheets

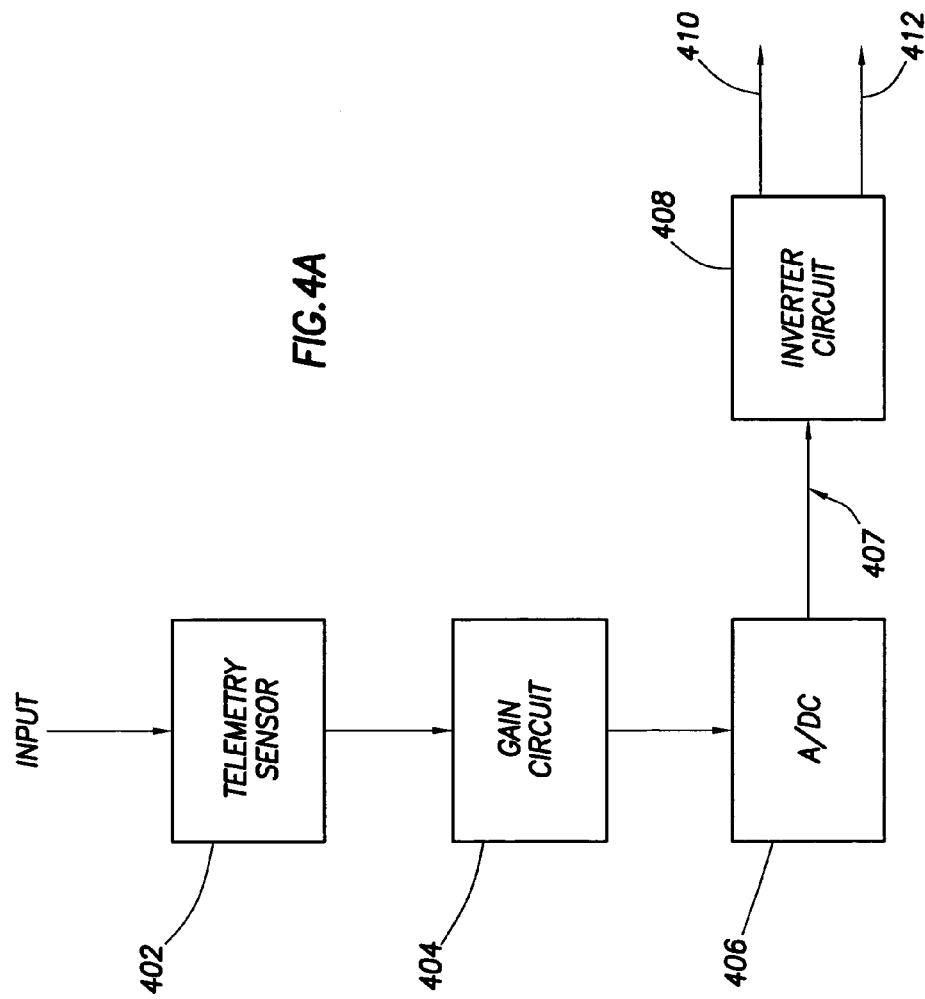

HIGH SPEED HAZARDOUS AREA COMMUNICATION WITH SAFETY BARRIERS

BACKGROUND OF INVENTION

Much like other industries, oil exploration continues to push current boundaries for application of high-tech communications. This is true for transmission of telemetry and control data between electronics located in a borehole and control stations. However, new technology must meet the stringent safety requirements present in most exploratory settings. The concern with safe operating procedures, for example, on an offshore oil rig 102 (FIG. 1) extends to all aspects of rig operation, including data transmission across rig cabling 112 and 118, typically many hundreds of feet in length. In some cases, safety protection is designed internal to certain surface equipment 108, located within the hazardous area, such that special cabling 112 can be used without concern for errant operation of equipment within the safe area 114.

However, for some equipment energy consumption restrictions are required. In these cases safe devices have been used which have very low power ratings. An example of such safe devices are called intrinsically safe, "IS", devices, certified by various standards agencies, such as Underwriters Labs in the United States and CENELEC in Europe. These IS devices, for example, are certified to have a low power rating, low energy storage capabilities, and low inductance and capacitance ratings. The primary concept for an IS device is that the device be incapable of creating a spark of sufficient energy to ignite a specified hazardous gas. To insure operational integrity of these safe devices, care must be taken in communicating or otherwise coupling to outside devices, located in the safe area, that are not safety certified to the same requirements.

Presently, safety barriers 110 are used for rig cabling 118 transmitting to or from an intrinsically safe certified device located in a hazardous area, such as pressure sensor 120. These safety barriers 110 are generally one or two channel devices which pass electrical signals but limit the transfer of energy to a level that cannot ignite explosive atmospheres. The safety barriers protect hazardous-area wiring and equipment from faults occurring in a safe area, such as control house 114. This allows use of standard, off-the-shelf, safe-area equipment that requires no additional certification.

Currently, information is transferred from the safe device 120, for example a mud pulse pressure sensor, across some length of cable 118 from a hazardous area through the safety barrier 110 to the control house 114. The signal is typically transmitted in analog form. Due to the high noise environment of a rig, for example, and the sometimes very long length of cable across which the signal must be transmitted, circuitry at the sensor system applies some level of gain to the signal before transmitting through the safety barrier. However, current applications are pushing the edge of this technology. Further, with ever increasing demand for complete and instantaneous information by the rig operator, for example, these pure analog systems are being fitted with analog-to-digital converter circuitry.

FIG. 2 illustrates a common application for operation of an IS sensor 200. For example, safe sensor 200 includes a pressure diaphragm 206 to sense pressure pulses transmitted via standpipe 222 in mud-pulse telemetry systems. As telemetry is detected an analog signal from IS sensor 200 is transmitted out of the hazardous zone 202 to an ADC circuit 218 in a safe zone 204. Here, the safety barrier 214 is placed between the zones, but not before the signal 210 is subjected to numerous interference sources 212, such as radios, high power rig motors and SCR power noise, to name a few. Assuming the signal is not degraded significantly, the cpu 220, located in a control house 224, receives a digital version of the analog signal in the safe area 204. Once the analog signal has been digitized, its immunity to noise and signal degradation across a length of cable increases substantially. However, as noted, the analog signal is still subjected to many interference sources 212 and sometimes hundreds of feet of cabling which can render the received signal unreadable.

Digital conversion electronics have been placed within the hazardous zone to provide a digitized signal earlier along the transmission line. The digital signals have a number of advantages over analog signals, including increased immunity and the ability to transmit at higher data rates. Present systems have achieved data rates of about 1.2K baud using the HART protocol to communicate with devices located in hazardous locations. Higher data rates are desired. One manufacturer has an active barrier that can achieve 19.2K baud using proprietary active barriers. However, the combination of the capacitance of very long cabling and the resistance of present safety barriers causes signal degradation at high data rates, essentially imposing a RC time constant on the digital signal. Furthermore, such active barriers are expensive and add equipment and design cost to the system. Even more prohibiting, as the rate of data transfer increases, the RC effects can override the data being transferred to the point that the received signal cannot be resolved.

SUMMARY OF INVENTION

A method and apparatus is disclosed for transmitting digital signals across safety transmission barrier. High data transfer rates are achieved for transfer from a safe certified device across the transmission barrier to a standard or non-rated device. A signal pair is generated including a first digital signal from the safe device and a second digital signal that is phase shifted from the first digital signal. Preferably, the second signal is phase shifted by 180 degrees, essentially being an inverted version of the first digital signal. The first and second digital signals are transmitted across the transmission barrier to a receiver in a safe area. An output signal is then reconstructed based on the falling edges of the first and second digital signals. The reconstructed signal closely approximates the first digital signal.

Further, the reconstructed signal may be generated where a falling edge of the second digital signal corresponds to a rising edge of the reconstructed signal and a falling edge of the first digital signal corresponds to a falling edge of the reconstructed signal.

BRIEF DESCRIPTION OF DRAWINGS

FIG. 4A is a block schematic of the transmitter system of FIG. 3.

DETAILED DESCRIPTION

According to the disclosed subject matter, a data communications system allows for high speed data transfer from an intrinsically safe device located in a classified hazardous area through standard passive safety barriers and cables. This capability is useful for digital pressure transducer communications to allow an increased amount of high resolution data. The disclosed apparatus and process is in part based upon known properties relating to common safety barriers.

Figure 1:
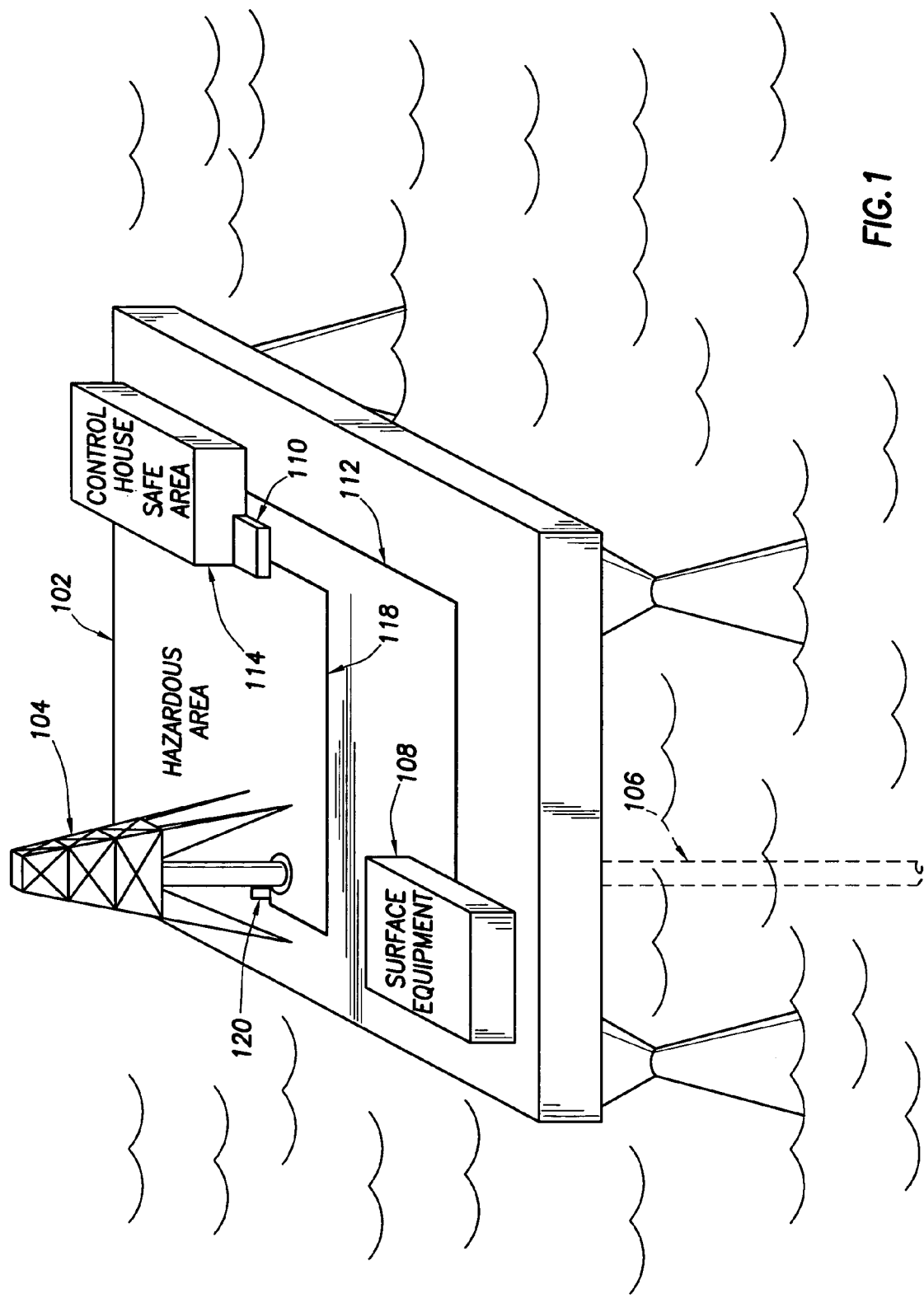
FIG. 1 is an illustration of an exemplary hazardous area communication system.
Figure 2:
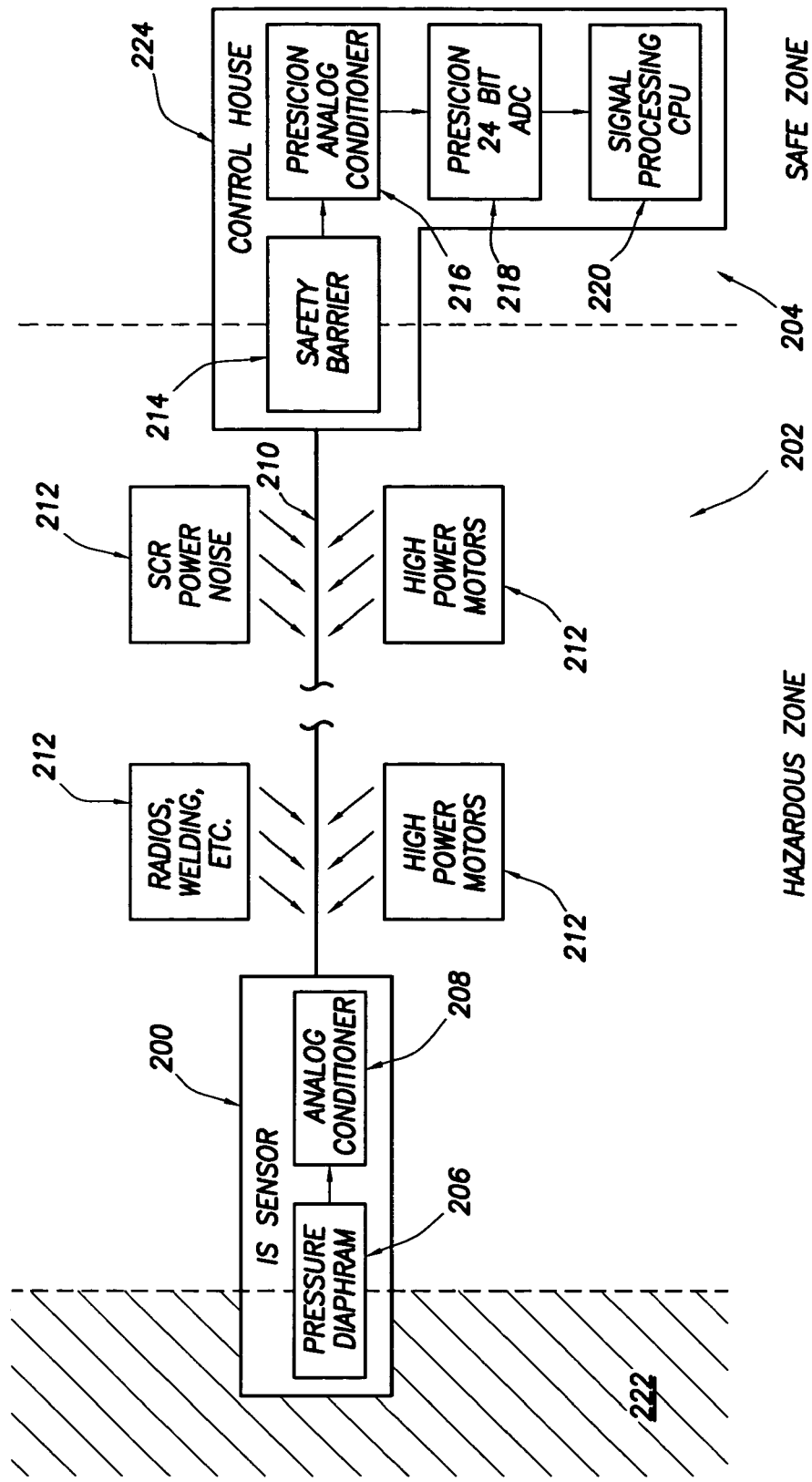
FIG. 2 is a prior art downhole telemetry transmission system.
Figure 3A:
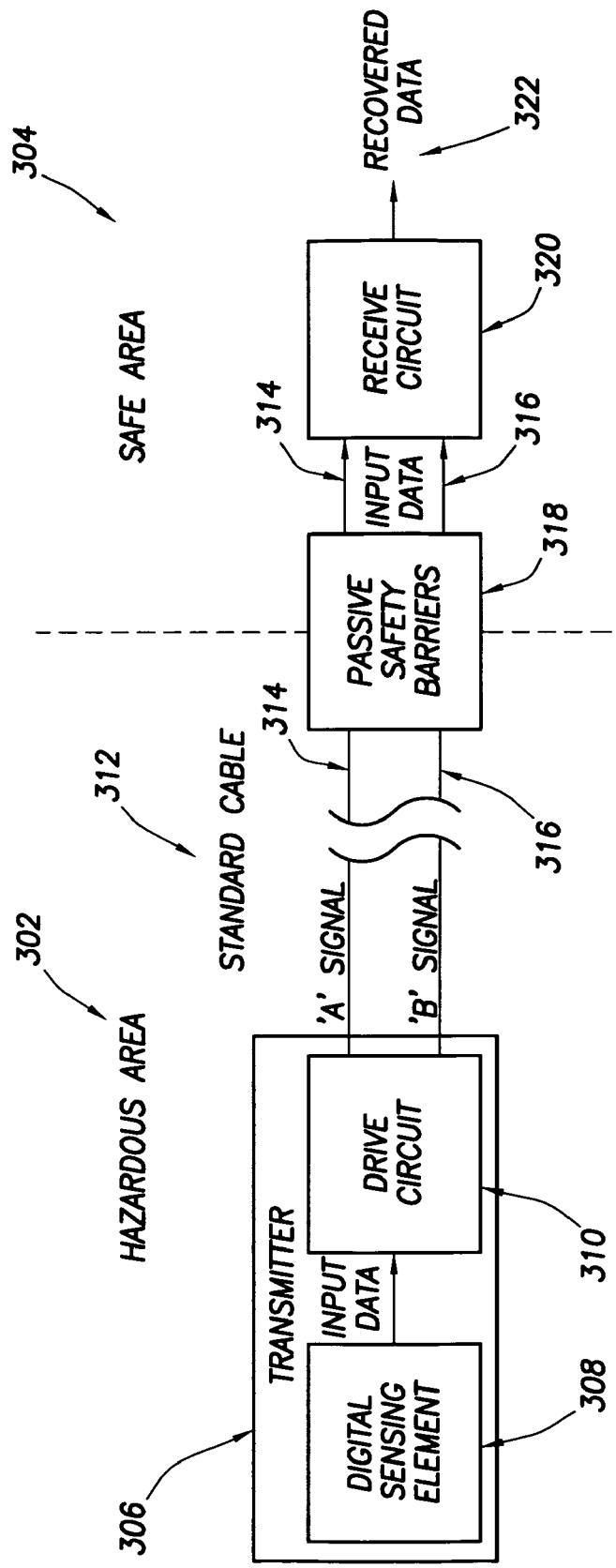
FIGS. 3A and 3B are exemplary data transmission systems according to the disclosed subject matter.

Turning now to FIG. 3, shown is a functional block diagram of an embodiment of the disclosed subject matter. Here a transmitter 306 is located in a designated hazardous area 302, such as on a drill floor on an offshore rig. The transmitter 306 is a safe device, such as an IS certified device, and generally includes a digital sensing element 308 and a drive circuit 310. The digital sensing element 308 functions, in part, to receive a signal in response to downhole electronics via known transmission protocols. For example, the signal may be sent uphole via mud pulse communications in a while drilling environment or directly by cable in a wireline environment. Additionally, data may be sent uphole via wired drill pipe also in a while drilling environment. Other modes of communications between downhole and surface equipment are contemplated under alternative embodiments. Further, the data or telemetry need not originate from downhole electronics. For example, data transmissions from an IS device attached to a specific piece of surface equipment can be transmitted from a hazardous area to a safe area, and vice versa, according to the disclosed techniques.

Continuing, the drive circuit 310 then receives the input data over a single data line and in turn drives a dual signal output 314 and 316 onto a standard cable 312. It should be noted that the drive circuit is not limited to one input line, but instead is capable of handling a number of inputs and for each of the multiple inputs generate a dual output pair. To simplify the discussion below, a single input signal is assumed.

A pair of output signals, "A" signal 314 and "B" signal 316 are an inverted pair of each other, preferably 180 degrees out of phase with one another. The inversion or phase shift is discussed in more detail with reference to FIG. 4. The digitized output signals 314 and 316 are transmitted through a passive barrier 318. As discussed, above the barrier 318 functions to isolate the hazardous zone 302 from the safe area 304. Although a standard barrier such as the MTL700 series shunt diode barriers, by MTL, Inc., for example, is contemplated, other communications barriers may be used with little to no modifications to the disclosed subject matter. Once through the safety barrier 318, data transmitted over signal lines 314 and 316 is received by the receive circuit 320. The receive circuit 320, discussed in more detail below, then reconstructs an output or recovered data 322 from the pair of signal lines 314 and 316.

Figure 3B:
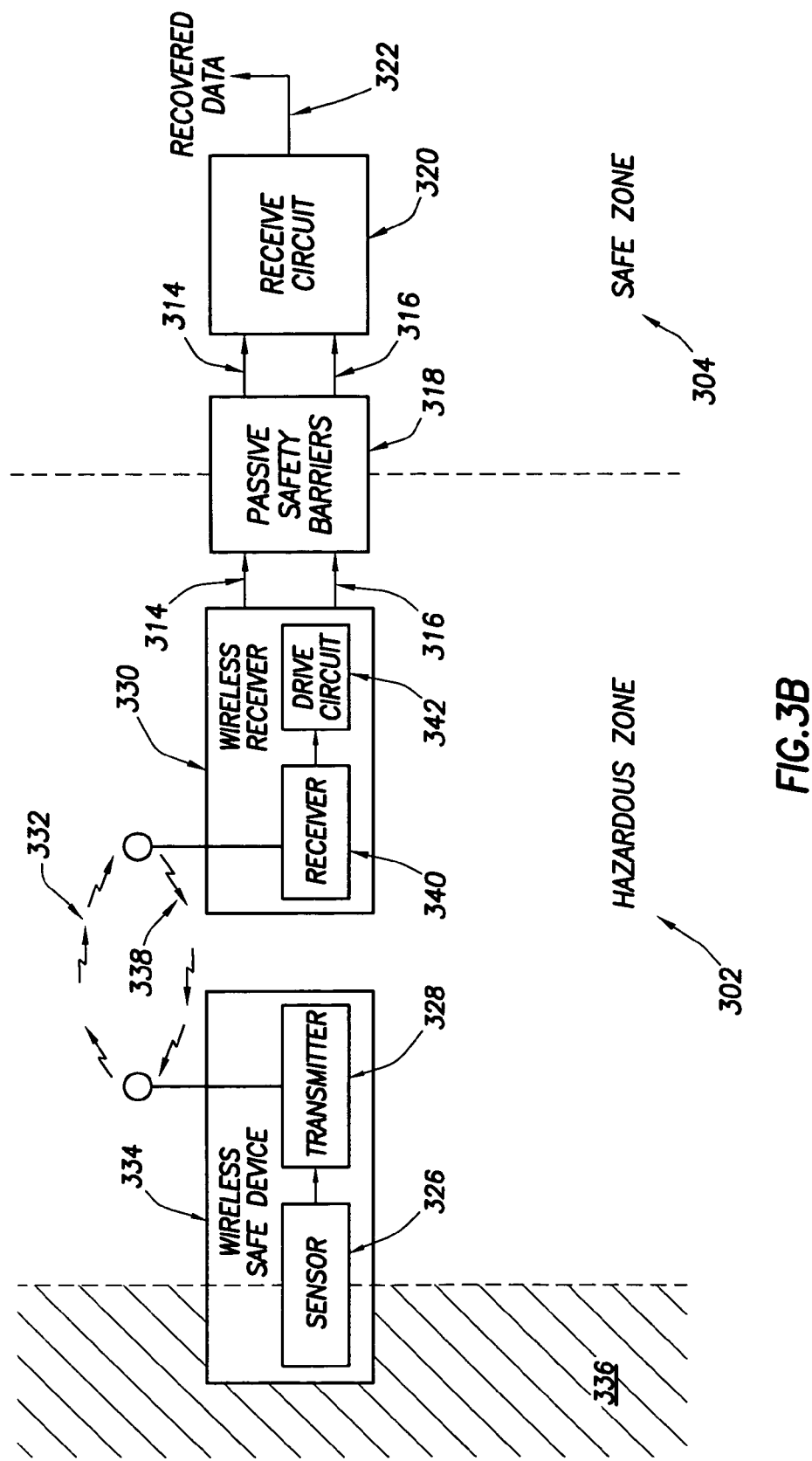

Turning to FIG. 3B, another embodiment is shown for a wireless communication system application of the disclosed subject matter. Much like the system of FIG. 3A, safe device 334 includes a sensor 326 for detecting data transmitted from downhole. For example, sensor 326 may be a pressure sensor for detecting mud pulse telemetry via standpipe 336. As mentioned above, the sensor may also be a receiver for receiving signals via wireline cable or wired drill pipe. The wireless safe device 334 takes the signal and transmits it using known wireless communication techniques, such as RF transmission, via transmitter 328. The wireless communication is received by wireless receiver 330, including a receiver 340 and drive circuit 342. The drive circuit 342 is similar to drive circuit 310 and functions to generate both an inverted 316 and non-inverted 314 signal pair. The same circuitry is then utilized to pass the signal pair from the hazardous zone 302 through the safety barrier 318 into the safe zone 304.

It should be noted that although the embodiments are discussed in the context of uni-directional communication from a hazardous zone to a safe zone, the same principles can be employed to allow bi-directional transmissions. For example, a second drive circuit, similar to the drive circuit 310 and 342, may be employed in the safe zone to generate the signal pair from digital control signals, for example, originated from the control house. A second receive circuit, similar to the receive circuit 320, is then employed in the hazardous zone to reconstruct the digital signal from the signal pair after passing through the barrier 318. The same signal lines 314 and 316 may be used for data transmission where known handshaking protocol is employed. Alternatively, additional signal line may be incorporated to allow the bi-directional transmission.

A more detailed component schematic of transmitter 306 is shown in FIG. 4A. A telemetry sensor 402 first receives the downhole transmission. The sensor 402 may be any number of known sensors depending on the type of communication protocol used. For example, a standard pressure sensor may be used according to known techniques to receive mud pulse pressure waves generated by downhole electronics, for example as part of a drill string. A standard data receiver may be employed in a wireline configuration using standard downhole cable communications. Other types of non-standard sensors may be used, such as for wireless RF communication, discussed briefly with reference to FIG. 3B.

An optional gain circuit 404 may be included depending upon the signal strength of the received signal. The gain circuit 404 functions to multiply the amplitude of the sensed signal according to know techniques. The signal or data is then passed through an analog to digital converter 406 to digitize the data from an analog form. In the case of wireline data, or other applications, the signal received from downhole may already be in digital form. In this case, the A/DC is not needed or may be bypassed. The digital signal is sent to the drive or inverter circuit 408. The inverter circuit 408 functions to generate two signal lines from the input signal line. The first signal line 410 is identical to the input signal, and is generated simply by passing the input signal through with little or no modification. The second signal line 412 is phase shifted from the first signal line 410. Ideally, the second signal line 412 is 180 degrees out of phase with the first. In this embodiment, the input signal is essentially inverted to generate the second signal transmitted on signal line 412.

The disclosed technique uses the known properties of common safety barriers. Since the ground wire (common) connects directly to the IS device ground point, the energy in the cable is reduced much faster than on a rising voltage. As discussed above, the rising voltage of the data signal is delayed by the effects of the R(safety barrier) X C(cable capacitance), in addition to any resistance in the wire or conditioning circuitry of the receiver. With the effects mentioned above, the expected signal resembles a rounded rising edge transition and a sharp falling edge transition. These effects, especially the rising edges, are a source of problems for transmitting data with the correct timing. Thus, according to the disclosed embodiments, a received signal is constructed from the falling edges of the transmitted signal pair 410 and 412. It should be understood that the falling edge transitions need not be perfectly sharp, and some "rounding" can be tolerated by the system without data loss. For example, since the falling transition of signal 410 will be of similar timing compared to the falling transition of signal 412, triggering of these falling edges, even with some slope, can be realized without data loss.

Figure 4B:
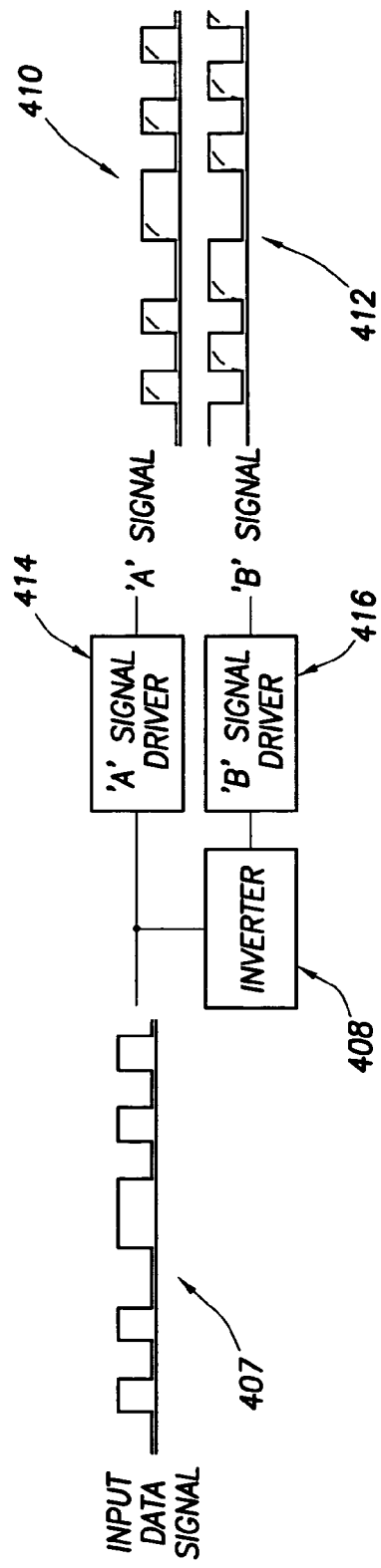
FIGS. 4B, 4C and 4D are illustrations of the waveforms associated with the system of FIG. 3.
Figure 4C:
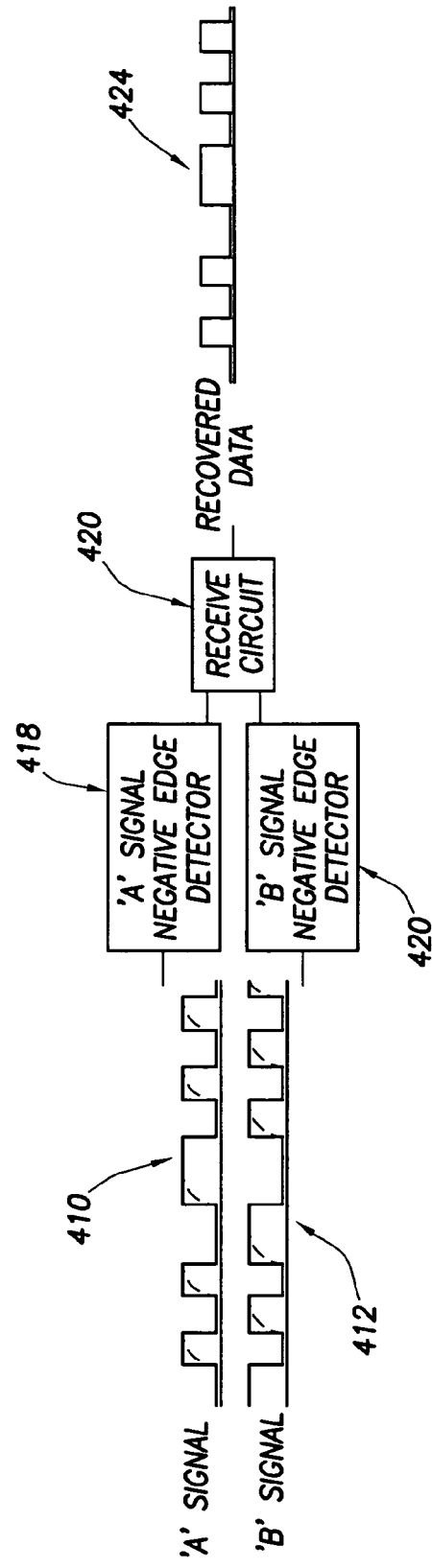
Figure 4D:
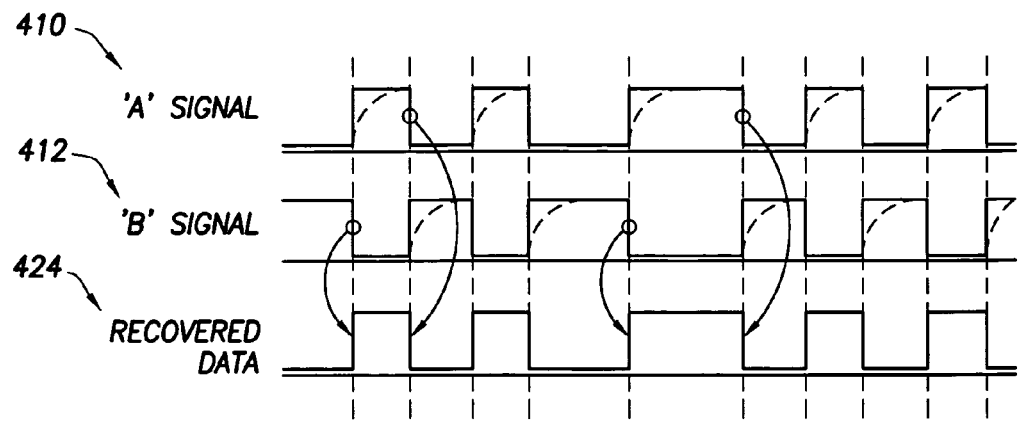

A more detailed illustration of the input and output signal is shown in FIGS. 4B and 4C. Data stream 407 represents a digital signal input to the drive circuit 310. The data stream 407 is a common data stream with a high voltage representing an active value (or "1") and a low voltage representing a low value (or "0"). The voltage levels of the signals are not critical and may be any number of high and low voltage level combinations. As described above the first output signal 410 is generated by simply passing the input signal through the drive circuit 414. The second output signal 412 is an inverted, or phase shifted, version of the input signal 407. The second output signal 412 is inverted by inverter 408 and is passed through the drive circuit 416. For transmissions originating from the IS devices, the output signals 410 and 412 will exhibit the effects of the RC time constant on the safe area side of the safety barrier 318.

Operation of the receive circuit 320 is shown in FIG. 4C. First the signal pair 410 and 412 fed into negative edge detectors 418 and 420, respectively. The receive circuit 422 then reconstructs the final data output stream from these falling edges. Specifically, shown in FIG. 4D, a falling edge of the second data stream, or "B" signal, 412 corresponds to a rising edge of the output data stream 424. A falling edge of the first data stream, or "A" signal, 410 corresponds to a falling edge of the output data stream 424. Because the "B" signal 412 is an inverted version of the "A" signal 410, its edges will substantially align but in opposite directions, i.e. a rising edge on the "A" signal 410 will correspond in time with a falling edge on the "B" signal 412. Further, because only the rising edges are significantly affected by the RC time constant, falling edge detector 420 is able to accurately detect the occurrence of that falling event. This will represent the beginning of an active value (or "1") on the reconstructed data stream. However, as shown on the "B" signal 412, the subsequent rising edge is affected by the RC time constant and does not provide a clean edge on which to determine the end of an active high value. In contrast the falling edge of the "A" signal 410 remains intact and is thus used to indicate the falling edge of the active value of a immediately previous active region. When combined, this accurately reconstructs the original data on the receiver side to be equivalent to the transmitter data. As mentioned above, bi-directional data transmission may be accomplished, in part, by adding a second receive circuitry including a second set of negative edge detectors on the hazardous zone side of the system.

Figure 5:
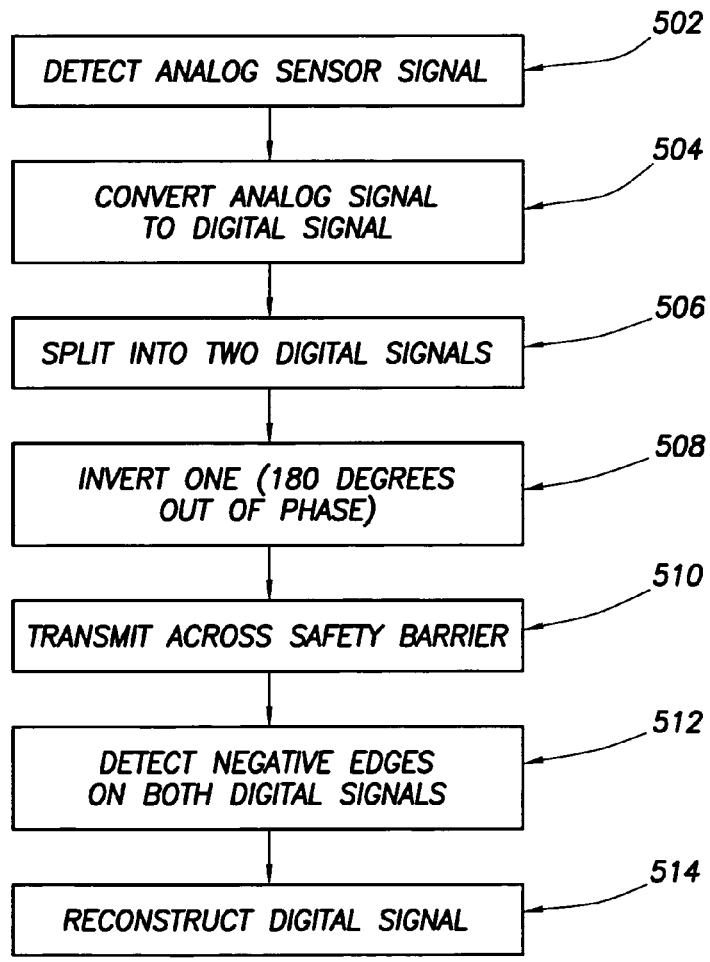
FIG. 5 is a flow diagram of an exemplary data transmission process according to the disclosed subject matter.

Turning now to FIG. 5, shown is an exemplary flow diagram of a method according to the disclosed subject matter. Beginning at step 502, a sensor detects an analog signal and digitizes the signal at step 504. As mentioned these two steps are skipped in a wireline embodiment, wired drill pipe or other applications where, for example, the signal sent by the downhole equipment, or other surface equipment, is already in digital form. Continuing at step 506, two signals are generated based on the original digitized signal. The first signal is generated as identical to the original signal or data stream and the second signal is an inverted version of the first generated at step 508. As discussed above, although precise inversion is preferred, a phase shift of 180 degrees is not necessary and even substantial phase shift variations can be tolerated by the system.

Once the signal pair is generated, the data is transmitted through cabling out of the hazardous region through a safety barrier at step 510. Once in the safe area, the receiver detects the negative or falling edges of the data streams at step 512 and at step 514 reconstructs a single output signal based on the combined falling edges of the received signal pair.

It should be noted that the disclosed approach avoids the need for expensive active barriers. Further, although the transmission barriers are shown as separate equipment, it is contemplated that the barriers may be integrated into a single device including the IS device, drive circuit and the safety barrier, further reducing costs and dependence on third party suppliers.

Figure 6A:
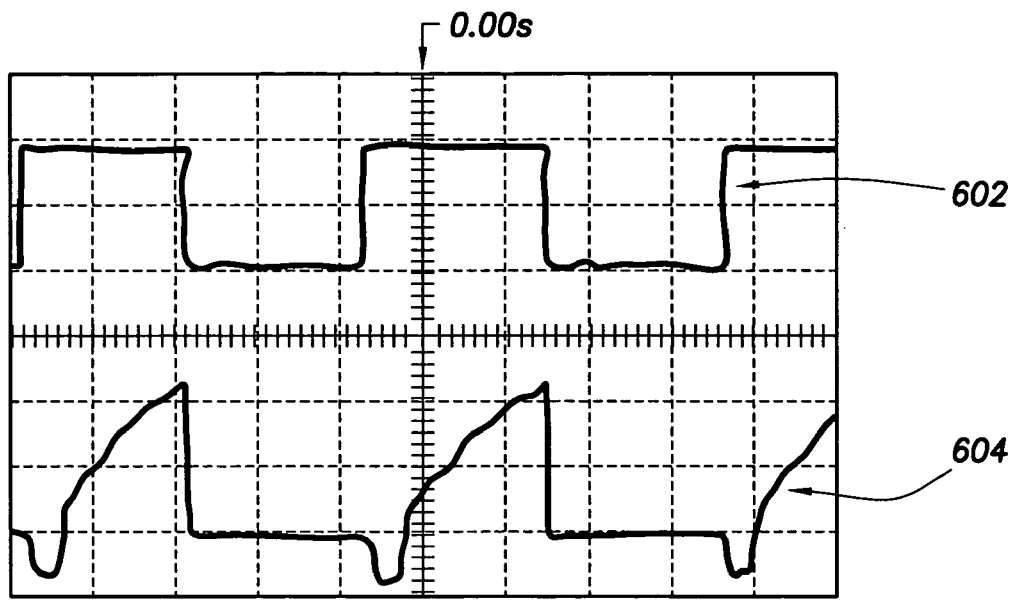
FIGS. 6A, 6B and 6C are screen shots showing the waveforms associated with FIG. 3.
Figure 6B:
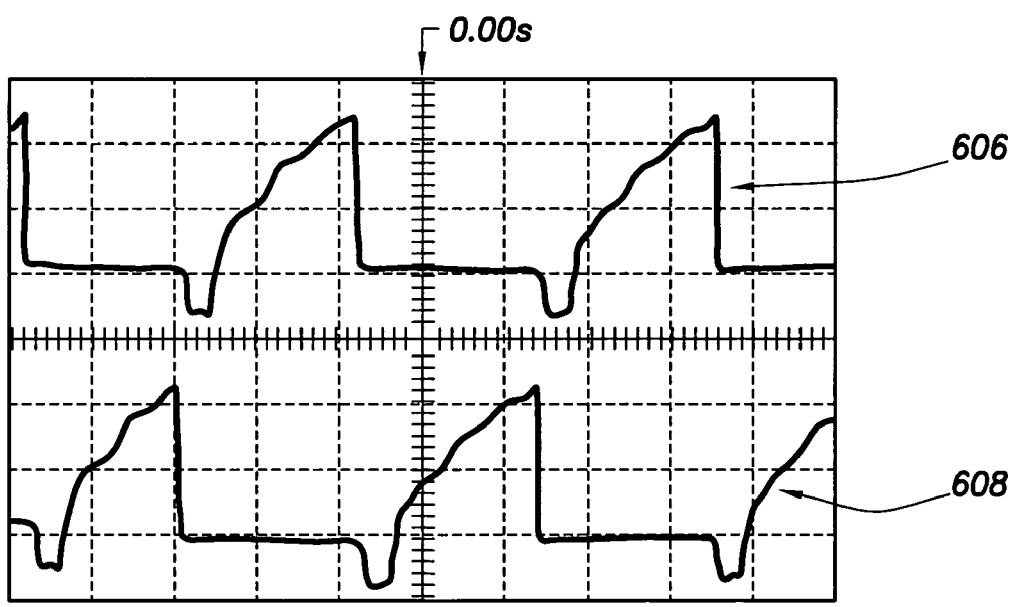
Figure 6C:
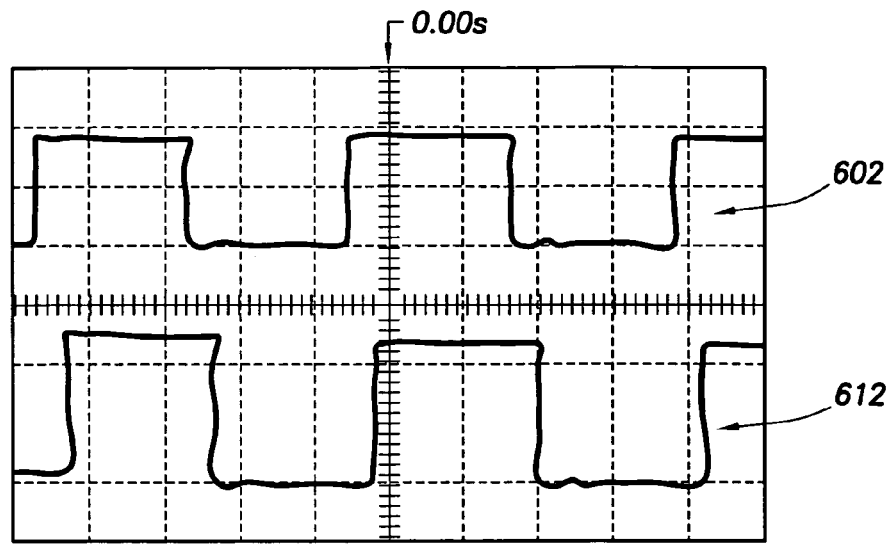

FIGS. 6A 6C are screen shots of actual waveforms. The waveforms of FIG. 6A were measured at the cable in the hazardous region. The top waveform 602 is the input data to the drive circuit 310. The bottom waveform 604 is the non-inverted signal connected to 1050 ft of cable connected through a safety barrier. The RC time constant is very obvious and can prevent accurate reception due to the signal degradation. In FIG. 6B, the top waveform 606 is the non-inverted data signal generated by the transmit circuit and the bottom waveform 608 is the inverted signal. Here, signal 608 is phase-shifted 180 degrees from signal 606. Based on falling edge detection of signals 606 and 608, a reconstructed signal 612 is shown in FIG. 6C. Comparison of 612 with the top waveform 602, which is the input waveform shown in FIG. 6A, illustrates very close correlation of the input signal and the output signal reconstructed after transmission across the long cable length and across the safety barrier.

Figure 7:
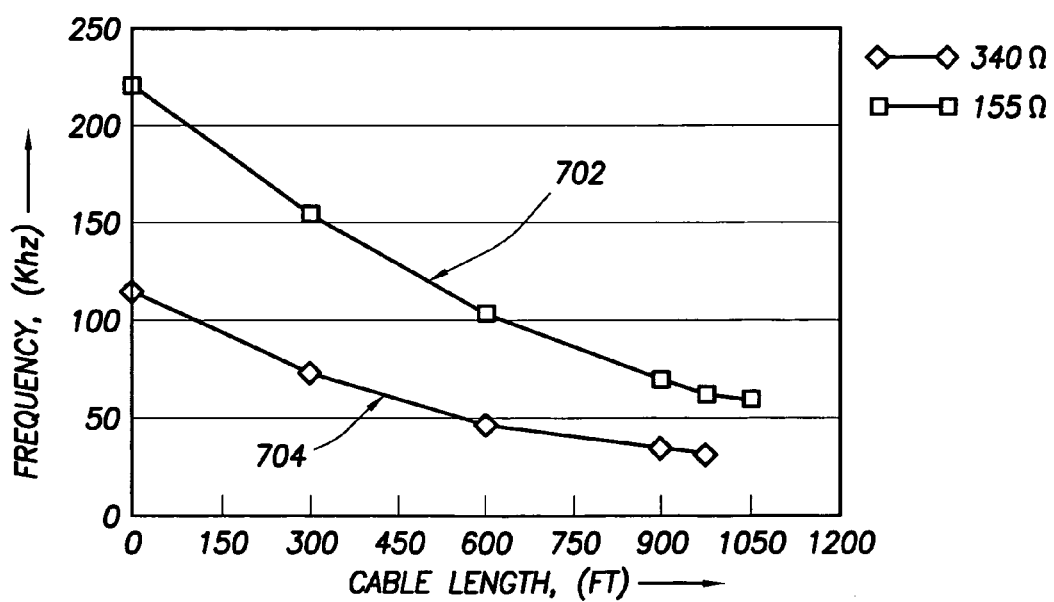
FIG. 7 is a graph showing the frequency response of an exemplary system of the disclosed subject matter.

FIG. 7 provides a chart for actual test results illustrating the data rate per cable length using two different safety barriers having different resistance ratings. The chart shows on curve 704 that for a 340 ohm safety barrier, data rates in excess of 50 KHz for 500 ft of cable and rates in excess of 40 KHz for 1000 ft of cable can be obtained. Using a less restrictive safety barrier for curve 702, data rates may be substantially improved.

Thus according to the disclosed embodiments, a drive circuit located within an intrinsically safe device sends data as a first signal and sends data as a second signal that is an inverted version of the first. A receive circuit located in a safe area receives the digital signal pair after passing through a safety barrier and uses a combination of the falling edges to reconstruct an output signal that is tolerant of the RC effect caused by the cable length and the safety barrier. Bi-directional data transfer is achieved using two sets of the drive and receive circuits on alternate sides of the transmission barrier. In this way, very high data rates can be achieved without the need for expensive active barriers. This further allows development of a fully proprietary system where the safety barriers are integrated in the safe device, further reducing costs. Further, the disclosed method and system can be used in conjunction with mud pulse telemetry and wireline downhole systems as well as wireless surface systems.

The forgoing disclosure and description of the various embodiments are illustrative and explanatory thereof, and various changes to the sensor circuit, the telemetry system, the materials and equipment utilized downhole, the organization of the circuit components and the order and timing of the steps taken, as well as in the details of the illustrated system may be made without departing from the disclosed subject matter.

What is claimed is:

1. A method for transmitting a digital signal across a transmission barrier, comprising the steps of:
   Receiving a first digital signal from a safe device;
   Generating a second digital signal that is phase shifted from the first digital signal;
   Transmitting the first and second digital signal across the transmission barrier to a receiver; and
   Generating a reconstructed signal by using the falling edges of the first and the second digital signals.

2. The method of claim 1, wherein the falling edges of the second digital signal correspond to rising edges of the reconstructed signal and the falling edges of the first digital correspond to falling edges of the reconstructed signal.

3. The method of claim 1, wherein the second digital signal is one-hundred eighty degrees out of phase compared to the first digital signal.

4. The method of claim 1, wherein the second digital signal is generated by inverting the first digital signal.

5. The method of claim 1, wherein the transmission barrier is a passive safety device.

6. The method of claim 1, wherein the falling edges of the first and second digital signals are not substantially degraded by the transmission barrier.

7. The method of claim 1, wherein the safe device is an intrinsically safe certified device.

8. The method of claim 1, further comprising the steps of: repeating the above steps for bi-directional data transmission across the transmission barrier.

9. The method of claim 1, further comprising the steps of: receiving an analog signal from a analog safe device; and converting the analog signal to the first digital signal.

10. The method of claim 9, wherein the analog safe device generates the analog signal in response to mud pulse telemetry.

11. The method of claim 1, wherein the safe device generates the first digital signal in response to a wireline data transmission.

12. The method of claim 1, wherein the safe device generates the first digital signal in response to an RF data transmission.

13. A communication system for transmitting a signal across a transmission safety barrier, comprising:
    a safe device for generating a digital output signal in response to a stimulus;
    an inverting circuit for generating a second digital signal that is phase shifted from the first digital signal;
    a transmitter for transmitting the first and second digital signals across the transmission safety barrier; and
    a receiver circuit comprising falling edge detectors for generating a reconstructed signal using the falling edges of the first and the second digital signals.

14. The communication system of claim 13, wherein the falling edges of the second digital signal correspond to rising edges of the reconstructed signal and the falling edges of the first digital correspond to falling edges of the reconstructed signal.

15. The communication system of claim 13, wherein the second digital signal is one-hundred eighty degrees out of phase compared to the first digital signal.

16. The communication system of claim 13, wherein the second digital signal is generated by inverting the first digital signal.

17. The communication system of claim 13, wherein the transmission barrier is a passive safety device.

18. The communication system of claim 13, wherein the falling edges of the first and second digital signals are not substantially degraded by the transmission barrier.

19. The communication system of claim 13, wherein the safe device is an intrinsically safe certified device.

20. The communication system of claim 13, wherein data is transmitted bi-directionally across the transmission barrier further comprising:
    a standard device for generating a third digital output signal in response to a stimulus;
    a second inverting circuit for generating a fourth digital signal that is phase shifted from the third digital signal;
    a second transmitter for transmitting the third and fourth digital signals across the transmission safety barrier; and
    a second receiver circuit for generating a reconstructed signal based on the falling edges of the third and the fourth digital signals.

21. The communication system of claim 13, further comprising:
    an analog safe device for generating an analog output in response to a stimulus; and a converter for converting the analog signal to the first digital signal.

22. The communication system of claim 21, wherein the analog safe device generates the analog signal in response to mud pulse telemetry.

23. The communication system of claim 13, wherein the safe device generates the first digital signal in response to a wireline data transmission.

24. The communication system of claim 13, wherein the safe device generates the first digital signal in response to an RF data transmission.

25. A method for digital data transmission across a safety barrier, comprising the steps of:
    generating a digital signal pair from an input signal, the digital signal pair comprising a first digital signal and a second digital signal, the second digital signal being inverted from the first digital signal;
    transmitting the digital signal pair across a transmission barrier; and
    generating a reconstructed signal output using the falling edges of the digital signal pair.

26. The method of claim 25, wherein the falling edges of the second digital signal correspond to rising edges of the reconstructed signal and the falling edges of the first digital correspond to falling edges of the reconstructed signal.

27. The method of claim 25, wherein the reconstructed signal closely approximates the input signal.

28. The method of claim 25, wherein the falling edges of the first and second digital signals are not substantially degraded by the transmission barrier.

29. The method of claim 25, wherein the input signal is generated by an intrinsically safe certified device.

30. The method of claim 25, wherein the second digital signal is inverted by phase shifting the second digital signal 180 degrees from the first digital signal.

31. The method of claim 25, further comprising the steps of:
    repeating the generating, transmitting and generating steps in the opposite transmission direction to achieve bi-directional data transfer.

* * * * *